United States Patent

Sigg

[19]

[11] Patent Number: 5,991,679
[45] Date of Patent: Nov. 23, 1999

[54] SAFETY SYSTEM FOR AN AUTOMATIC GEARBOX

[75] Inventor: Peter Sigg, Friedrichshafen, Germany

[73] Assignee: ZF Friedrichshafen AG, Friedrichshafen, Germany

[21] Appl. No.: 09/000,352

[22] PCT Filed: Sep. 25, 1996

[86] PCT No.: PCT/EP96/04180

§ 371 Date: Jan. 16, 1998

§ 102(e) Date: Jan. 16, 1998

[87] PCT Pub. No.: WO97/13083

PCT Pub. Date: Apr. 10, 1997

[30] Foreign Application Priority Data

Sep. 29, 1995 [DE] Germany .......................... 195 36 339

[51] Int. Cl.[6] .................................................. G06F 17/00
[52] U.S. Cl. ................. 701/62; 701/51; 701/52; 701/63; 477/74; 477/75; 477/92; 477/129; 192/3.51; 192/4 R
[58] Field of Search .................................. 701/51, 52, 62, 701/63, 67; 192/3.51, 3.31, 3.58, 4 R; 477/74, 75, 78, 120, 125, 129, 154, 155, 92

[56] References Cited

U.S. PATENT DOCUMENTS

| | | | |
|---|---|---|---|
| 4,779,490 | 10/1988 | Milunas et al. | 74/862 |
| 4,899,278 | 2/1990 | Yamamoto et al. | 701/62 |
| 5,157,607 | 10/1992 | Stainton et al. | 701/62 |
| 5,182,969 | 2/1993 | Goto et al. | 74/866 |
| 5,680,307 | 10/1997 | Issa et al. | 701/62 |
| 5,729,454 | 3/1998 | Amsallen | 701/62 |
| 5,839,083 | 11/1998 | Sugiyama | 701/62 |

FOREIGN PATENT DOCUMENTS

| | | |
|---|---|---|
| 0 398 057 A2 | 11/1990 | European Pat. Off. . |
| 0 436 977 A2 | 7/1991 | European Pat. Off. . |
| 0 651 181 A1 | 5/1995 | European Pat. Off. . |
| 0 719 967 A1 | 7/1996 | European Pat. Off. . |

*Primary Examiner*—William A. Cuchlinski, Jr.
*Assistant Examiner*—Gertrude Arthur
*Attorney, Agent, or Firm*—Davis and Bujold

[57] ABSTRACT

For an automatic gearbox (2) a safety system is proposed in which erroneous releasing of the clutch or brake during cross-over is detected by the fact that the time variations of the transmission input speed and of the product of the transmission output speed multiplied by the first reduction ratio do not increase.

3 Claims, 4 Drawing Sheets

SAFETY SYSTEM FOR AN AUTOMATIC GEARBOX

The invention relates to a safety system for an automatic gearbox in which for an upshift or a downshift an error of the releasing clutch or brake can be detected when the difference of the transmission input speed and the product of the transmission output speed multiplied by the first reduction ratio does not steadily increase.

BACKGROUND OF THE INVENTION

By the generic expression automatic gearbox is to be understood electrohydraulically controlled automatic gearboxes where the gearshift is carried out as cross-over gearshift. In cross-over gearshifts, the gearshift results by a first clutch or brake releasing and second clutch or brake engaging. In automatic gearboxs, it is usual, in general, to monitor the orderly operation thereof in order to prevent situations critical to safety. Monitored are the input signals made available by the sensors, the electromagnetic actuators, the electronic transmission control and, via acknowledged variables, the clutches and brakes that take part in the gearshift. It is of special interest here to detect a faulty releasing of a clutch or brake since this can result in the blocking of the transmission and subsequent destruction. A faulty release is thus extremely critical to safety.

SUMMARY OF THE INVENTION

Therefore, the invention intends to solve the problem of providing, for an automatic gearbox, a safety system which detects a faulty release of a clutch or brake.

According to the invention, the solution of the problem is that at the start of a gearshift, the electronic control device cyclically calculates from the measured transmission output speed, as a first parameter G1, the product of transmission output speed multiplied by the first ratio, and as second parameter G2 measures the transmission input speed. From the difference between the first and second parameters a time variation is determined for two consecutive values. The electronic control device detects an error of the releasing clutch or brake when the the difference after load take-up does not increase. This solution offers the advantage that with the aid of the two parameters, it is possible to assess whether the gearshift proceeds methodically. In case of an error, the gearshift is discontinued and the automatic gearbox remains in the initial gear.

In one embodiment, it is proposed that the first and second parameters be each surrounded by an envelope curve. An error exists when after the load take-up the envelope curves still overlap so that the values of the two parameters G1, G2 represent within the envelope curves the faulty area and values and outside the envelope curves the fault-free area. This embodiment offers the advantage that tolerances of the speed sensors are not immediately assessed as an error of the releasing clutch or brake.

In another embodiment, it is proposed that briefly increased slip on the input gears be detected when the values of the first parameter G1 are below the second parameter G2.

BRIEF DESCRIPTION OF THE DRAWING(s)

An embodiment is illustrated in the figures that show:

DESCRIPTION OF THE PREFERRED EMBODIMENT(s)

Figure 1:
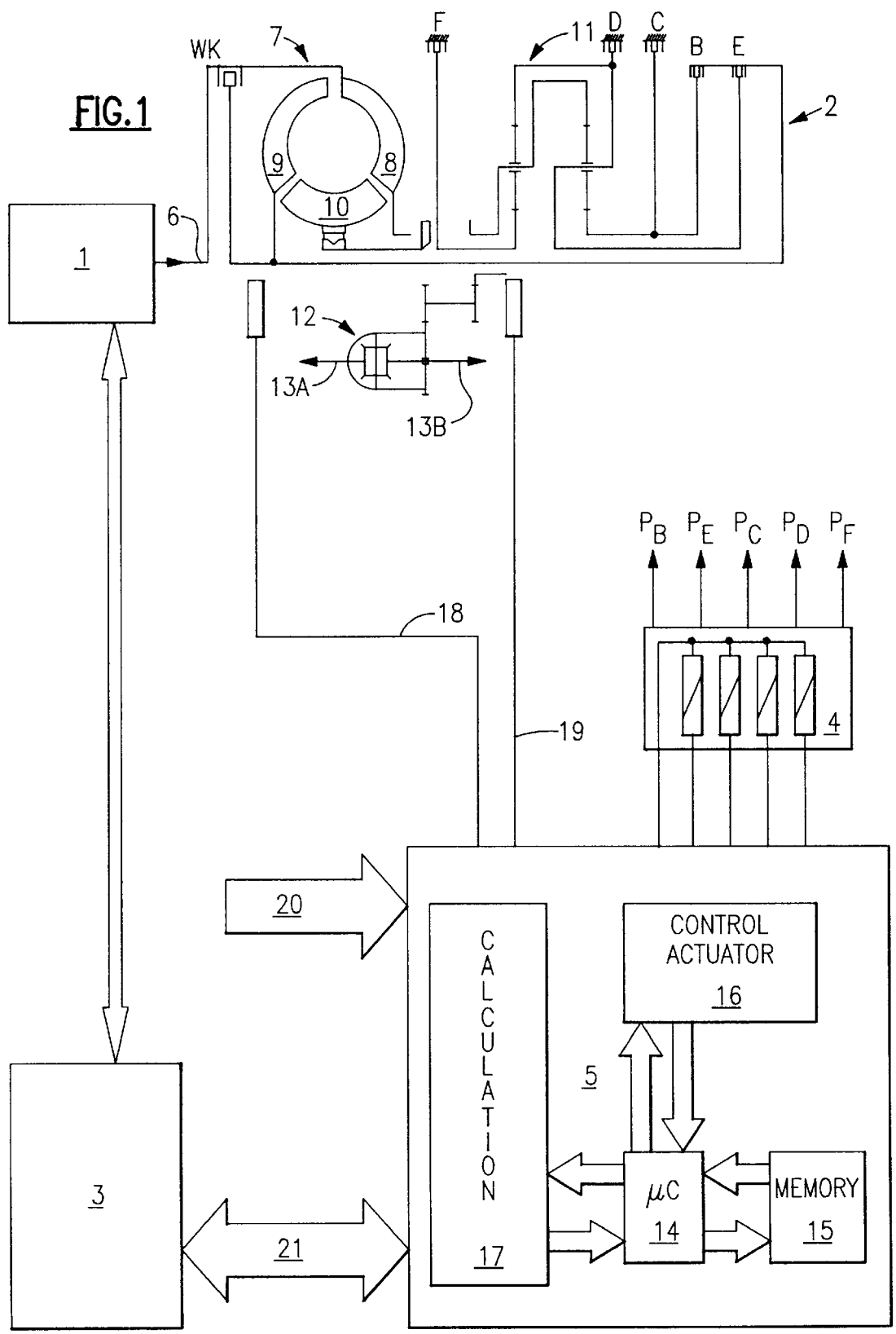
FIG. 1 is a system diagram of an automatic gearbox.

In FIG. 1 is shown an automatic gearbox 2. The automatic gearbox 2 is comprised of a hydrodynamic converter 7, a combined planetary transmission 11 with differential 12, a hydraulic control device 4 and a electronic control device 5. An internal combustion engine 1 drives the automatic gearbox 2 via input shaft 6. An electronic engine control device 3 controls or regulates the internal combustion engine 1. The input shaft 6 is non-rotatably connected with the hydrodynamic converter 7 and drives the impeller 8 thereof. It is known that the hydrodynamic converter 7 consists of the impeller 8, one turbine wheel 9 and one stator 10. A converter bridge clutch, parallel to the hydrodynamic converter 7, is shown without reference numeral. When the converter bridge clutch is actuated, the turbine shaft rotates at the same speed as the input shaft 6. The combined planetary transmission 11 consists of two planetary gear pairs and the clutches and brakes B to F. From FIG. 2 can be seen the corresponding gear coordination for the clutch/brake combination. The output takes place via the differential 12 and the two axle half shafts 13A and 13B. Since the mechanical part is not relevant for a better understanding of the invention, no detailed description is given. The clutches and brakes B to F are controlled or regulated by the electronic control device 5 via the hydraulic control device 4. The electromagnetic actuators and hydraulic successive sliders are in the hydraulic control device 4. The function blocks micro-controller 14, memory 15, function block calculation unit 17 and function block control actuators 16 of the electronic control device 5 are shown in very simplified form. The memory 15 is usually designed as EPROM or as buffered RAM. In the memory 15 is stored the data relevant to the transmission. The function block control actuator 16 serves to control the electromagnetic actuators in the hydraulic control device 4. The function block calculation unit 17 serves to calculate the data relevant to the gearshift. The latter are determined from the input parameters 18 to 21. Input parameters 20 are, for example, the signal of a selector lever, the speed of the internal combustion engine, the signal of the position of an accelerator pedal or throttle valve, the temperature of the hydraulic fluid, etc. The electronic engine control device 3 and the electronic control device 5 are interconnected by a data line 21. Said data line 21 can be designed as a single-wire interface in order, for example, to carry out an engine control. The data line 21, moreover, can also be designed as bidirectional data line for a bus system such as CAN bus. The transmission input speed 18 and the transmission output speed are additional input parameters for the control device 5.

Figure 3:
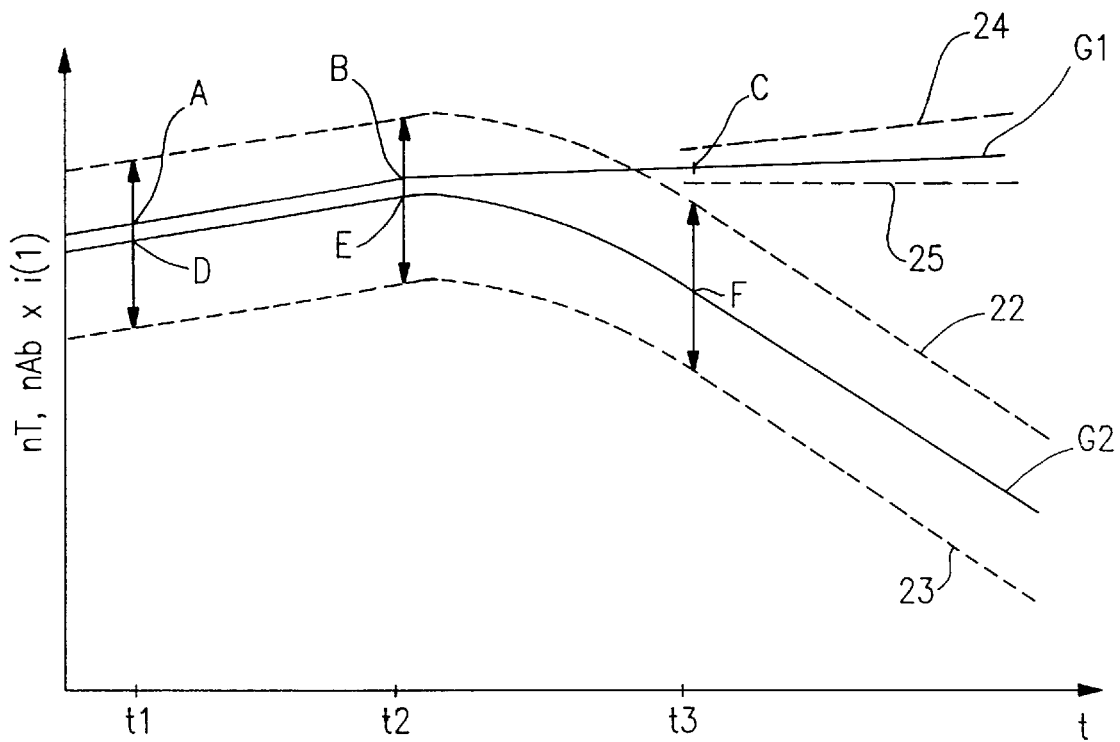
FIG. 3 is an ideal time variation of the first and second parameters for an upshift.

FIG. 3 shows an ideal variation of both parameters G1 and G2 for an upshift. On the abscissa is plotted the time, on the ordinate are plotted the speed values of the first parameter G1 (G1=nAB×i1) and G2 (G2=nT). Here nAB stands for the transmission output speed and nT for the transmission input speed. For the three inquiry times t1, t2 and t3, there thus results for the first parameter G1 the series of points A, B and C. The series of points D, E and F results for the second parameter G2. The operation of the safety system is as follows: the gearshift is initiated at the zero moment. As a first moment t1, the value of the first parameter G1, point A, is calculated and the value of the second parameter G2, point D is determined. At a second moment t2, the first parameter G1 is again calculated, point B, and the value of the second parameter G2, point E, is determined. The time variation from first to second parameters is determined by the difference formation, wherefore the following applies:

$$dG1=G1(t2)-G1(t1)$$

$$dG2=G2(t2)-G2(t1)$$

At the third moment t3, the process is repeated and results in the points C and F. Between the moments t2 and t3, the second clutch took over the load of the first clutch. Thereby changes the time variation of the second parameter G2. The calculated values of the first parameter G1 remain almost constant, since the transmission output speed remains almost constant. The amount of the difference values of the first and second parameters are related to each other. For the inquiry moment t3, the deviation ratio is from point C to point F. In a methodical variation of the gearshift, the amount increases. In FIG. 3 are additionally shown two hysteresis bands which surround the ideal variation of the first and second parameters. For the first parameter G1, the upper limit for the hysteresis band is marked with the reference numeral 24 and the lower limit with the reference numeral 25. For the second parameter G2, the reference numeral 22 shows the upper limit and the reference numeral 23 corresponds to the lower limit. The advantage obtained hereby is that measurement errors or interruptions in the speed signals do not prevent the detection of an error. The band width of the hysteresis is obtained from tests and amounts, for example, to +/−100 revolutions.

Figure 4:
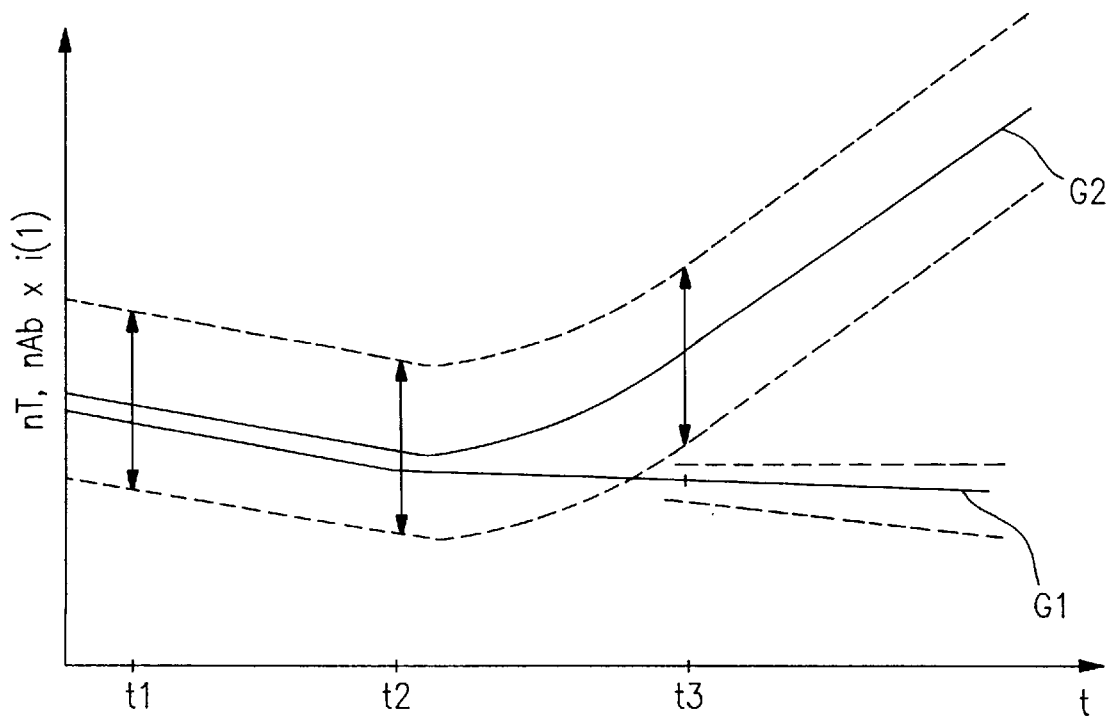
FIG. 4 is an ideal time variation of the first and second parameters for a downshift.

FIG. 4 shows an ideal variation of the two parameters G1 and G2 for a downshift. On the abscissa is plotted the time, on the ordinate are plotted the speed values of the first parameter G1 (G1=nAB×i1) and second parameter G2 (G2=nT). What has been said in relation to FIG. 3 applies to the calculation of the two parameters and of the process.

Figure 5A:
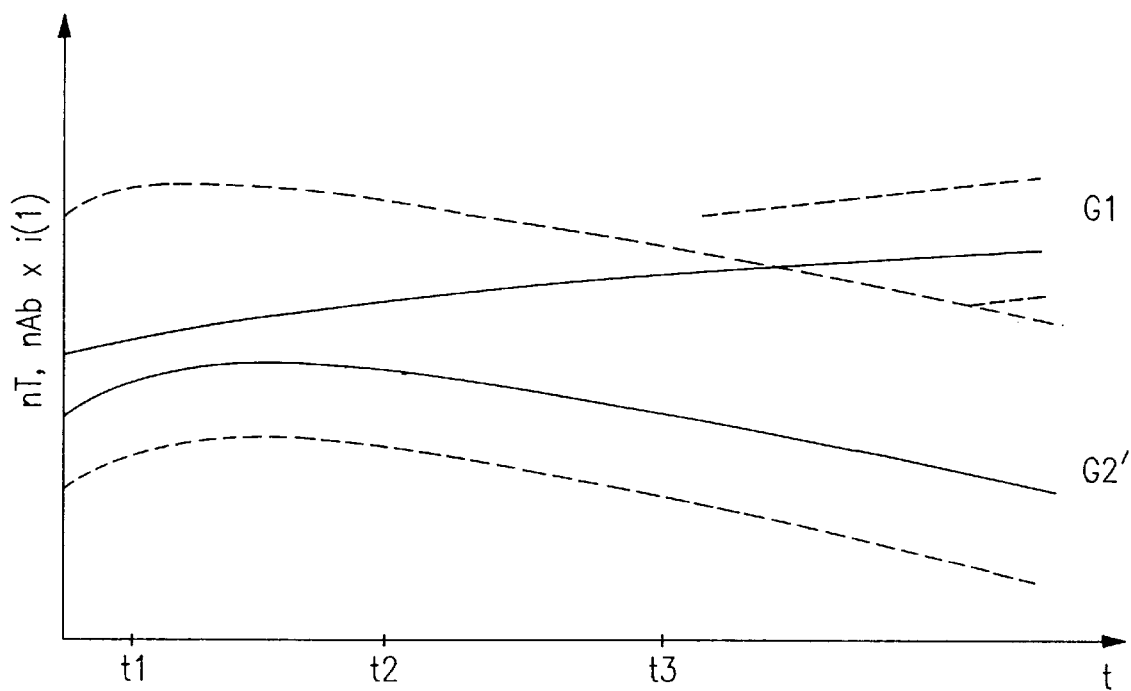
FIG. 5a is a faulty time variation for an upshift, 1st case.

FIG. 5A shows the variation of both parameters G1 and G2 for a faulty upshift. Unlike in a methodical upshift, the second parameter G2 is here designated with G2'. The envelope curves of both parameters remain overlapped even after the load take-up. A first cause of error can be that the releasing clutch or brake does not open methodically. A second cause of error is when too low a pressure level exists in the engaging clutch. Because of this, the engaging clutch cannot take up the load from the releasing clutch. The two causes of error produce a lesser variation of the second parameter G2' in comparison with the variation of the second parameter G2 during a methodical gearshift.

Figure 5B:
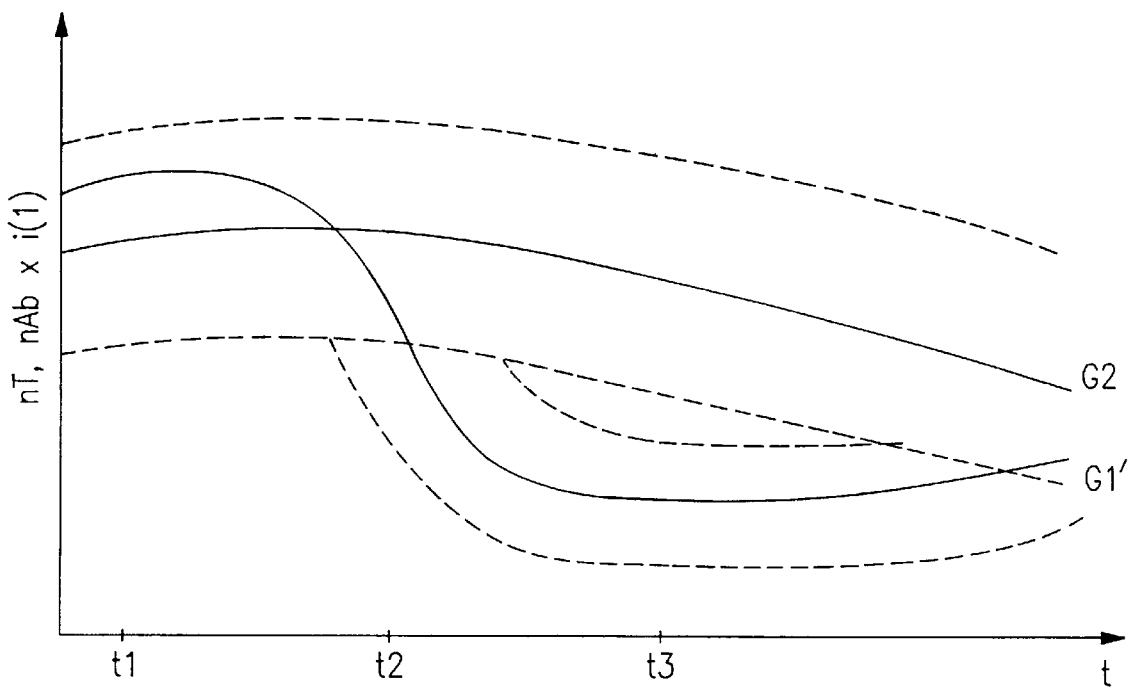
FIG. 5b is a faulty time variation for an upshift, 2nd case.

FIG. 5B shows another faulty upshift. The error becomes apparent in that the value of the first parameter G1, designated G1' here, is below the value of the second parameter G2. This is the case when sharp variable changes in friction value, such as slippage, occur in the input gears of the vehicle.

Figures 2, 6:
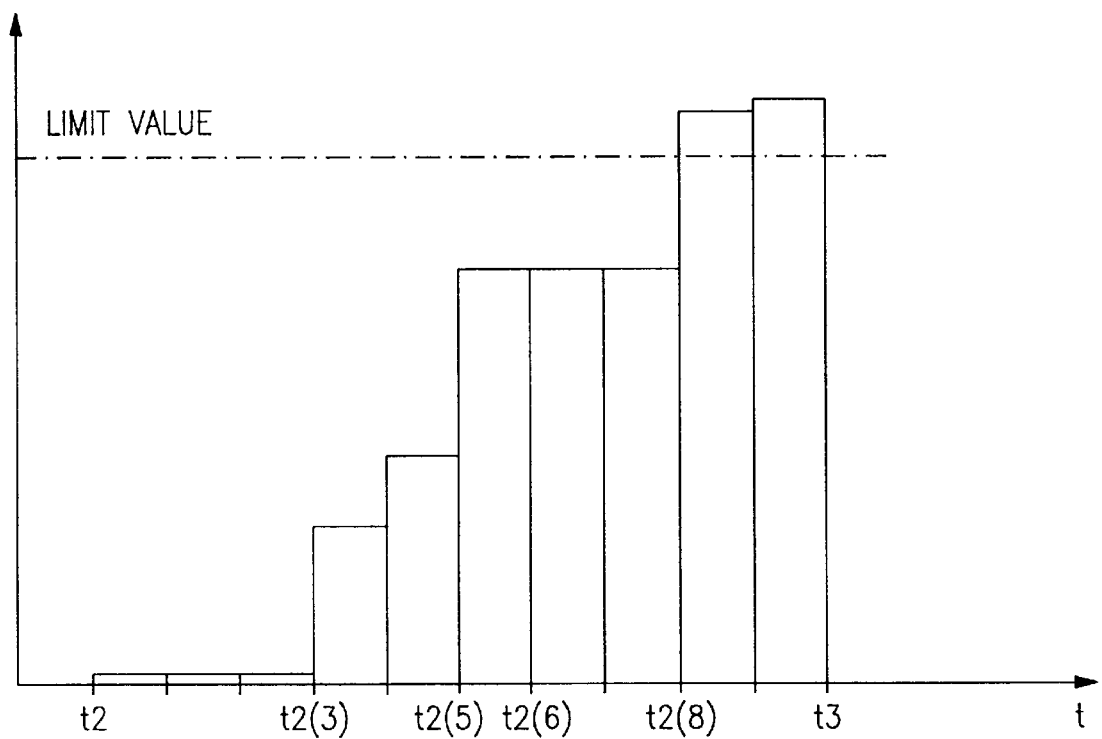
FIG. 2 is a clutch-brake logic of the automatic gearbox.
FIG. 6 is a diagram, number of the successful/unsuccessful test conditions.

FIG. 6 shows another embodiment. The point of departure here is that in the time interval t2 to t3, the output and input speeds of the transmission are detected with a higher inquiry frequency. As a result of this, both parameters G1 and G2 are also calculated with a higher frequency. During the time interval t2 to t3, the number of the successful test conditions and of the unsuccessful test conditions is counted and added up. A successful test condition exists when the envelope curves of the first and second parameters do not overlap. In FIG. 6, the test condition in the time interval t2 to t2 (3) is negative and in the time interval t2 (3) to t2 (5) the test conditions are positive. In the time interval t2 (5) to t2 (8), the test condition, in turn, is not satisfied. At the moment t2 (8), the total exceeds a limit value. Starting from said limit value the gearshift is defined as methodical.

REFERENCE NUMERALS 1 internal combustion engine
2 automatic gearbox
3 electronic engine control device
4 hydraulic control device
5 electronic control device
6 input shaft
7 hydrodynamic converter
8 impeller
9 turbine wheel
10 stator
11 combined planetary transmission
12 differential
13A axle half shafts
13B axle half shafts
14 micro-controller
15 memory
16 function block control actuators
17 function block calculation unit
18 transmission input speed
19 transmission output speed
20 input parameters
21 data line
22 hysteresis band
23 hysteresis band
24 hysteresis band
25 hysteresis band
G1 first parameter
G2 second parameter
G2' second parameter, faulty
G2" second parameter, faulty

I claim:

1. A safety system for an automatic gearbox (2) comprising clutches and brakes (B, F), a hydraulic control device (4) and an electronic control device (5), which controls and regulates, via said hydraulic control device (4), in accordance with input parameters (18 to 21), said clutches and brakes (B, F) whereby a corresponding gear or a ratio (i) is selected, said electronic control device (5) being supplied, as input parameters, transmission input speed (nT(t)), transmission output speed (nAB(t) and initiation of a shift, from a first ratio (i1) to a second ratio (i2) carried out by release of a first clutch or brake and engagement of a second clutch or brake, and, said electronic control device (5) calculates cyclically from the measured transmission output speed (nAB(t)), as first parameter (G1), the product from the transmission output speed multiplied by the first ratio (G1=nAB×i1) and from the transmission input speed, as second parameter (G2), from the first and second parameters (G1, G2), a time variation is determined from two consecutive values by difference formulation (dG1=G1(t2)−G1(t1) and dG2=G2(t2)−G2(t1), the time variation of said first and second parameters (G1, G2) each being between hysteresis curves (22, 23, 24 and 25), whereby said electronic control device (5) detects an error of the releasing clutch or brake when the hysteresis curves overlap after load take-up which represents a shift fault.

2. The safety system according to claim 1, wherein briefly increased slippage is detected on input gears of the transmission as a result of the values of the first parameter (G1) being smaller than the values of the second parameter (G2).

3. The safety system according to claim 1, wherein for a predetermined time interval (t2) to (t3) after load take-up, the transmission input speed (nT(t)) and the transmission output speed (nAB(t)) are measured at a higher inquiry frequency, the first and second parameters (G1, G2) are determined therefrom and the number of the successful and unsuccessful test conditions is counted and added together, an error being detected when the total does not exceed a presettable limit value, the successful test condition existing when after load take-up both envelope curves do not overlap and an unsuccessful test condition existing when both envelope curves do overlap.

* * * * *